(12) United States Patent
Hepkin

(10) Patent No.: US 7,260,698 B2
(45) Date of Patent: Aug. 21, 2007

(54) METHOD AND SYSTEM FOR PAGE INITIALIZATION USING OFF-LEVEL WORKER THREAD

(75) Inventor: David Alan Hepkin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 10/697,867

(22) Filed: Oct. 30, 2003

(65) Prior Publication Data

US 2005/0097294 A1    May 5, 2005

(51) Int. Cl.
G06F 12/00    (2006.01)

(52) U.S. Cl. .......................... 711/170; 713/1; 713/100; 711/202

(58) Field of Classification Search ................ 711/202, 711/170; 713/1, 2, 100
See application file for complete search history.

(56) References Cited

U.S. PATENT DOCUMENTS 6,128,713 A * 10/2000 Eisler et al. ................ 711/159
6,247,042 B1 * 6/2001 Engstrom et al. ........... 711/202
6,408,305 B1 * 6/2002 Stoodley .................. 707/103 R
7,139,909 B2 * 11/2006 Lee ............................ 713/100

OTHER PUBLICATIONS

"Packing Variable-Sized Segments in the Swap File of a Paging-Based Virtual Memory System", IBM Technical Disclosure Bulletin, vol. 39, No. 3, Mar. 1996, pp. 301/302 XP000581702.*

* cited by examiner

Primary Examiner—Pierre-Michel Bataille
(74) Attorney, Agent, or Firm—Hamilton & Terrile, LLP; Stephen A. Terrile

(57) ABSTRACT

A method, an apparatus, and a computer program product are presented for memory page initialization operations. After an application thread attempts to reference a memory page, an exception or fault may be generated, and a physical memory page is allocated. The application thread is put to sleep, and a page initialization request is given to a kernel off-level worker thread, after which the interrupt-level processing is concluded. During the normal course of execution for the worker thread, the worker thread recognizes the page initialization request, and the worker thread initializes the newly allocated page by zeroing the page or by copying the contents of a source page to the newly allocated page, as appropriate. The worker thread then puts the application thread into a runnable state.

27 Claims, 7 Drawing Sheets

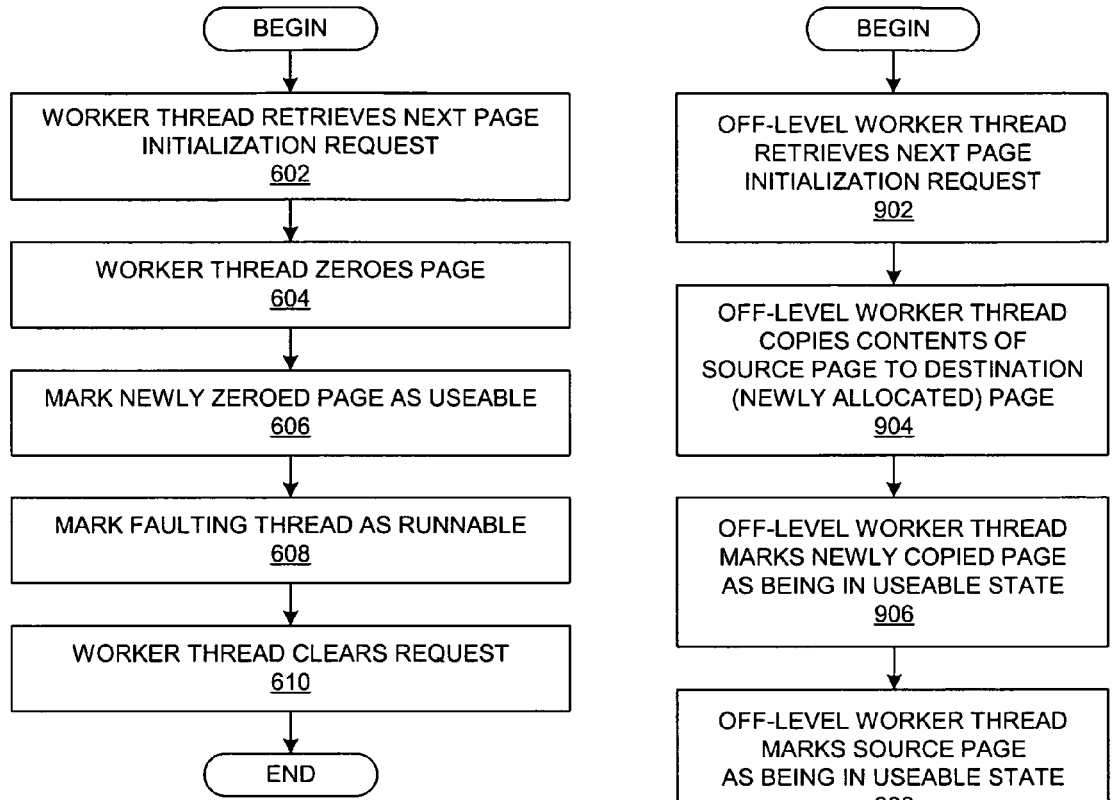
FIG. 6
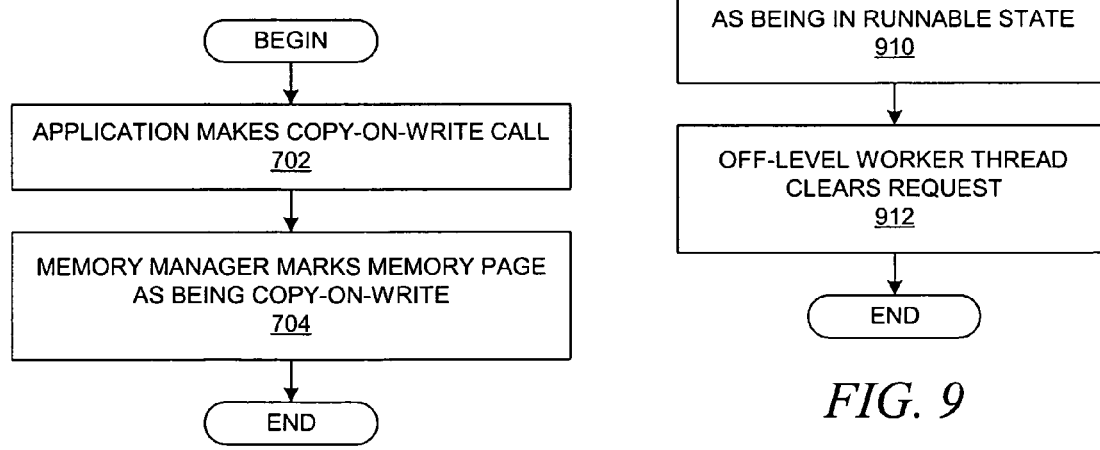
FIG. 7
(PRIOR ART)
FIG. 9

METHOD AND SYSTEM FOR PAGE INITIALIZATION USING OFF-LEVEL WORKER THREAD

BACKGROUND OF THE INVENTION

1. Field of the Invention

The present invention relates to an improved data processing system and, in particular, to a method and apparatus for memory initialization.

2. Description of Related Art

An on-demand page-based virtual memory operation system, such as most UNIX™ operating systems, allocates page frames dynamically as needed. When a thread references a virtual page that does not have a page frame, a page fault is generated, and the operating system dynamically allocates a page frame. During the allocation of a page frame, the operating system must initialize the page.

A page initialization operation usually consists of either a zeroing-type or a copying-type of initialization. During a zeroing-type of initialization, the entire page frame is zeroed, e.g., following a first reference to a new virtual page. During a copying-type of initialization, the contents of a previously allocated virtual page are copied to the page frame that is being allocated, e.g., following a copy-on-write fork operation.

These page-zero and page-copy operations are done at interrupt-level while servicing the page fault. Hence, while the page initialization is being performed, no other thread can be dispatched on the CPU, and no lower-priority interrupts can be serviced. Usually this is not a problem because most operating systems are deployed to support small page sizes, and the amount of time that is required for a page initialization operation is relatively small.

For large pages, however, the time spent disabled at interrupt-level on a CPU while initializing a page frame can be problematic. For example, lower priority interrupts can be lost. In addition, thread dispatching can be impeded, particularly when a page initialization operation requires more time than a typical time slice that is provided by a thread scheduler. Noticeable slowdowns in performance may also be observed by users of a system.

As the price of memory decreases, more memory is added to data processing systems, and processors are being implemented to support larger page sizes, thereby leading to more frequent problems caused by page initialization operations. Rather than perform page initialization operations at interrupt-level and incur the penalties that have been mentioned above, other prior art solutions have been attempted.

One prior art solution performs page initialization operations more statically. Rather than faulting pages into an application's address space as the pages are referenced, all of the pages that might be needed by a process are initialized when the process is initialized, thereby avoiding page initialization operations in an interrupt environment at page-fault time. However, this solution moves away from an on-demand paging system and can introduce severe restrictions on the amount of memory that can be referenced. The initialization procedure may be quite lengthy since a large amount of memory must be initialized at one time, and much of this memory may never be referenced by a process.

Another prior art solution performs the page initialization operations in a piece-wise fashion using chunks that are smaller than the page size. On the first reference fault of a page frame, the entire page frame is allocated, but rather than initializing the entire page frame, only a chunk of the page frame is initialized. However, this solution is limited to software-managed translation lookaside buffer (TLB) architectures. After every chunk of the larger page frame has been referenced and initialized, then all of the chunk-sized translations are removed, and one translation is entered for the entire page frame. This solution introduces a number of penalties. Specifically, a page fault must be incurred for each chunk; for a 16 megabyte page frame with 4 kilobyte chunks, 4096 page faults would be incurred to initialize the entire page frame. Another drawback is that the page frame is translated on a chunk-size basis until the entire page frame is initialized, and any performance gains from using a large page translation are not achieved until all of the smaller chunks in the page frame have been initialized.

Therefore, it would be advantageous to perform page initialization operations much more efficiently while alleviating the problems that are mentioned above.

SUMMARY OF THE INVENTION

A method, an apparatus, and a computer program product are presented for memory page initialization operations. After an application thread attempts to reference a memory page, an exception or fault may be generated, and a physical memory page is allocated. The application thread is put to sleep, and a page initialization request is given to a kernel off-level worker thread, after which the interrupt-level processing is concluded. During the normal course of execution for the worker thread, the worker thread recognizes the page initialization request, and the worker thread initializes the newly allocated page by zeroing the page or by copying the contents of a source page to the newly allocated page, as appropriate. The worker thread then puts the application thread into a runnable state.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 6 depicts a flowchart that shows a process for performing a zeroing-type initialization operation by an off-level kernel worker thread on a newly allocated memory page;

FIG. 7 depicts a flowchart that shows a typical process by which an application configures a memory page using a copy-on-write operation;

FIG. 9 depicts a flowchart that shows a process for performing a copying-type initialization operation by an off-level kernel worker thread on a newly allocated memory page.

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
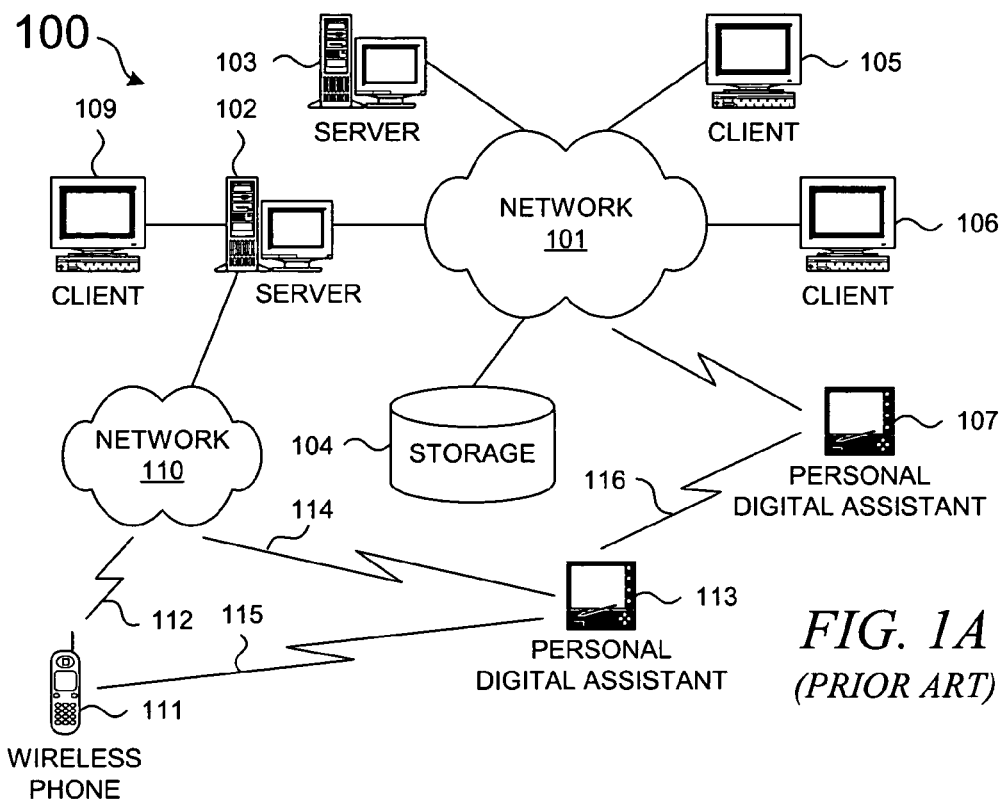
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
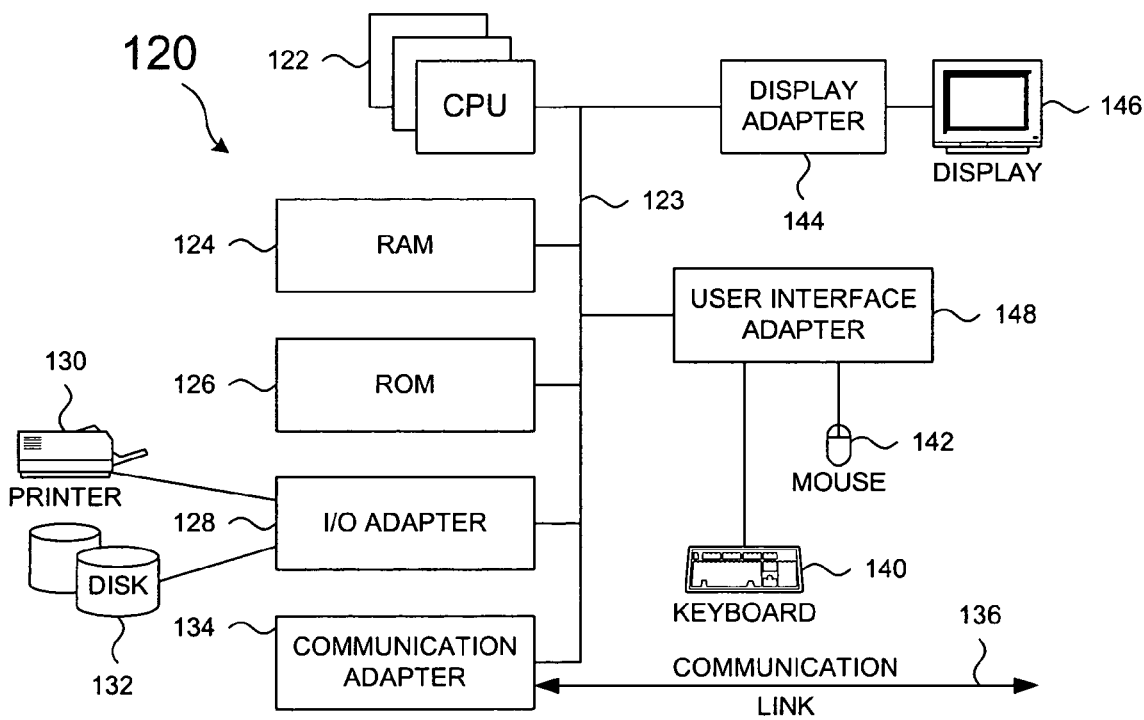
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. Although all of the components that are shown within FIG. 1A and FIG. 1B are not required by the present invention, these elements may be used by a component in which the present invention is embedded, e.g., an operating system, an application, or some other component. In addition, the present invention may be implemented in a computational environment in which various components, such as display devices, are used indirectly to support the present invention, e.g., to allow configuration of parameters and elements by a system administrator.

More specifically, though, the present invention is directed to an improved process of memory initialization. Prior to describing the improved process of memory initialization in more detail, some typical memory management techniques are illustrated.

Figure 2:
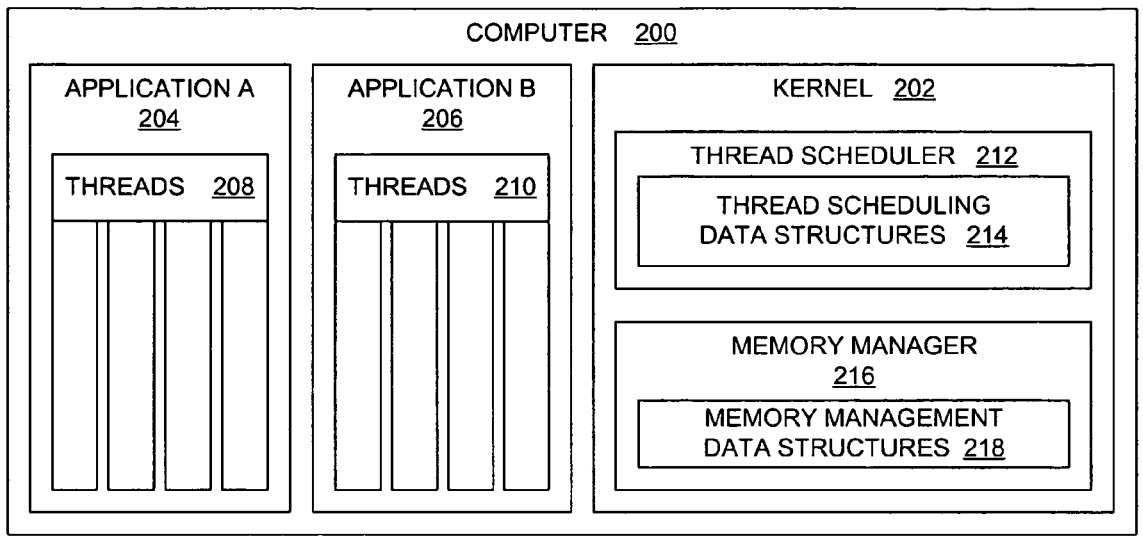
FIG. 2 depicts a block diagram that shows a logical organization of components on a typical data processing system that supports the execution of multithreaded applications in memory that is managed by an operating system kernel.

With reference now to FIG. 2, a block diagram depicts a logical organization of components on a typical data processing system that supports the execution of multithreaded applications in memory that is managed by an operating system kernel. Computer 200 supports an operating system which contains kernel 202, which controls the execution of multithreaded applications 204 and 206, which comprise threads 208 and 210, respectively. Thread scheduler 212 within the kernel determines when a thread runs and when it is suspended using thread scheduler data structures 214, which are data structures for assisting in the management of thread scheduling tasks. For example, the thread scheduler's data structures may include FIFO (first-in, first-out) queues, such as queues that are associated with various thread states, e.g., a runnable queue, a sleeping queue, an I/O-blocked queue, a mutex-waiting queue, or other states. Memory manager 216 within the kernel provides functionality for memory allocation, memory deallocation, on-demand paging, etc., as reflected within memory management data structures 218. Thread scheduler 212 and memory manager 216 may be implemented as one or more kernel-level threads, i.e., with kernel-level or supervisory privileges, that act with at various levels of execution priority.

Figure 3:
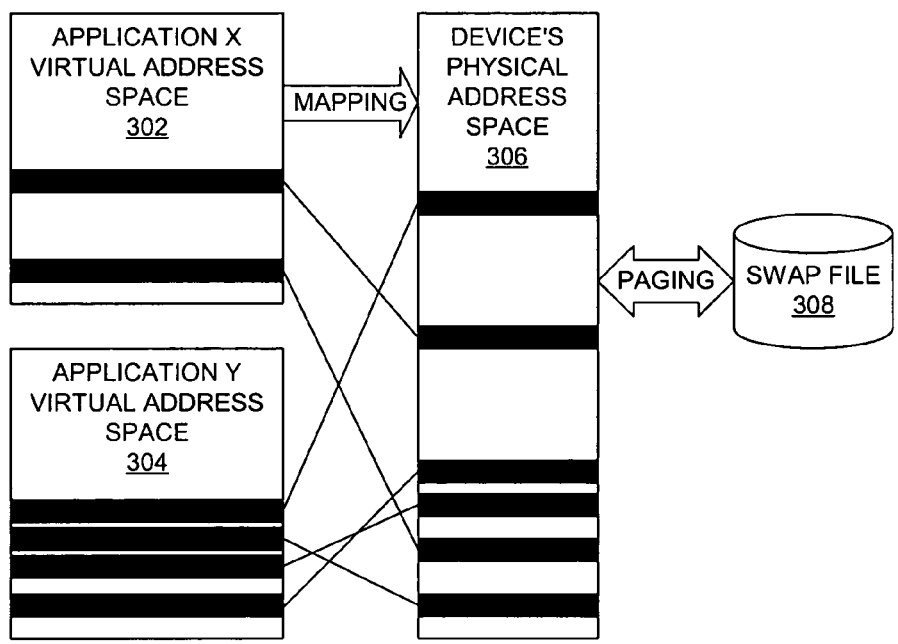
FIG. 3 depicts a block diagram that shows some aspects of memory management that a typical kernel-level memory manager may perform.

With reference now to FIG. 3, a block diagram depicts some aspects of memory management that a typical kernel-level memory manager may perform. In most runtime environments, the kernel supports concurrent execution of multiple applications, each of which acts in accordance with possession of a unique virtual memory space. However, the kernel ensures that the virtual memory spaces are supported within a physical memory space. A first application executes within its own virtual address space 302, while a second application executes within its own virtual address space 304. The kernel's memory management functions are responsible for mapping virtual memory pages within a virtual address space to physical memory pages within physical address space 306 that is constrained by the main memory of the runtime environment, which is usually random access memory (RAM).

Upon an initial attempt by a thread to access a virtual memory location within a virtual memory page, a kernel-level memory manager performs several operations before the thread may access the memory location. For example, the memory manager allocates a physical memory page, associates the virtual memory page with the physical memory page, and then initializes the physical memory page, after which the thread may access its desired memory location.

Since a memory page has a fixed size, a memory page is typically identified by the most significant portion of the memory address to the first memory location of the memory page. From another perspective, by dividing a memory space into memory pages of a certain size, the memory space may be regarded as an array of memory pages, each of which is identifiable by an index number, which is equal to the most significant portion of the address of the first memory location within the memory page. Hence, the association of a virtual memory page with a physical memory page is typically reflected as a mapping between a virtual memory address (or most significant portion thereof) and a physical memory address (or most significant portion thereof). This mapping is reflected within the kernel's memory management structures along with various hardware structures (not shown) that may provide support for memory management functions, such as a translation lookaside buffer (TLB). A virtual memory page is often simply referred to as a page that is identifiable by a page number, whereas a physical memory page is often referred to as a page frame that is identifiable by a page frame number.

As the main memory becomes scarce, the memory manager temporarily stores some of the pages from main memory into a swap space or a pagefile in secondary memory, shown as swap file 308, which is usually stored on disk. When those pages are subsequently needed by a thread, then the pages are read from swap file 308 back into main memory 306, and other pages may be swapped out. In this manner, a secondary memory becomes an extension of the main memory, and an application may access significantly more virtual memory than can be supported by the physical RAM at any given time.

Information about the memory pages and their states are kept in various memory management data structures. The kernel typically delegates the task of swapping pages into and out of the swap space to an off-level worker thread, which is often termed a "pager thread" that performs "pager I/O". The pager thread has kernel-level privileges, thereby allowing it to access the memory management data structures that are stored in physical memory areas that are reserved for the kernel. The pager thread may execute with a configurable priority level.

Figure 4:
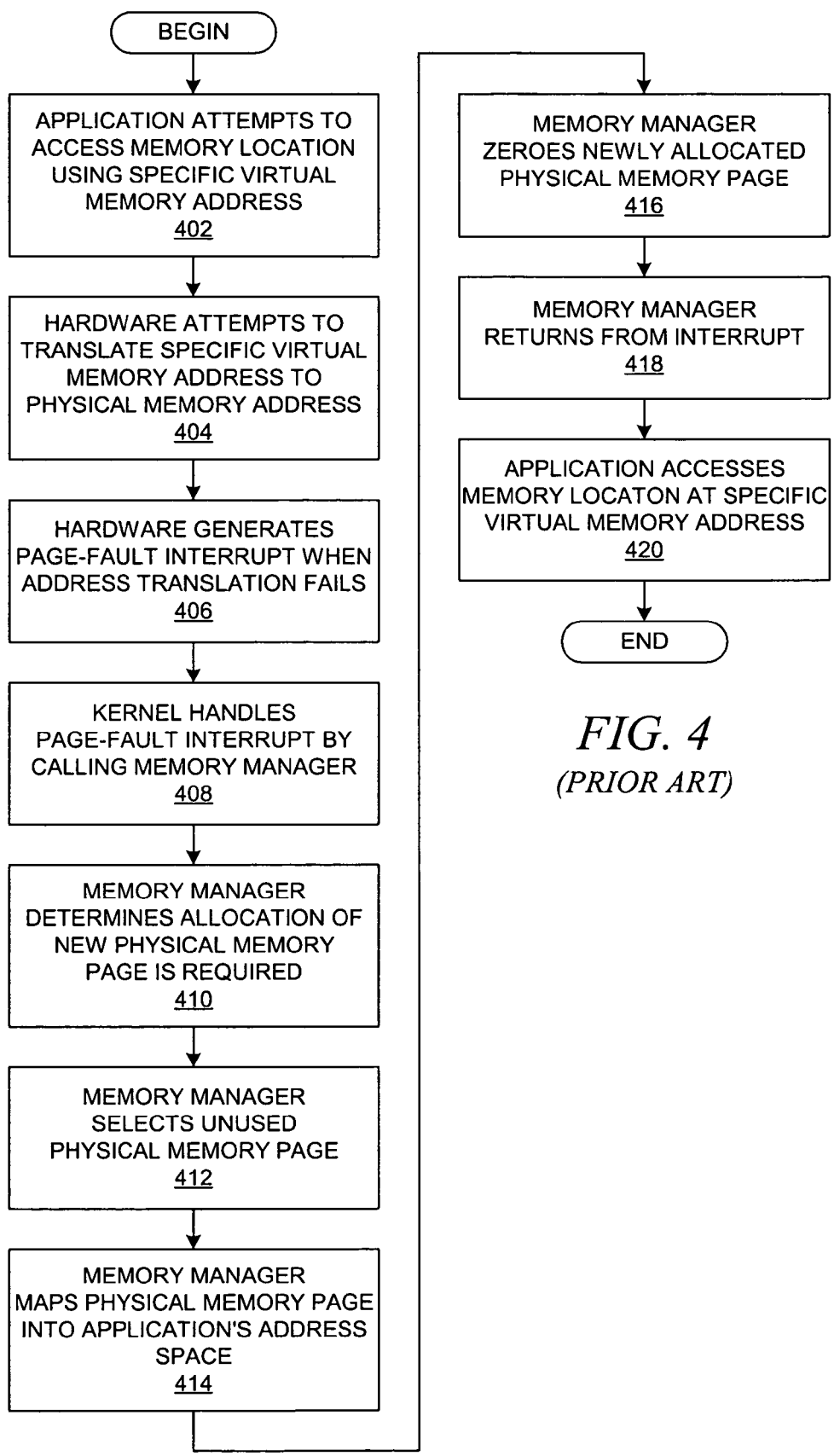
FIG. 4 depicts a flowchart that shows a typical process for performing an initialization operation on a memory page upon an initial reference by an application.

With reference now to FIG. 4, a flowchart depicts a typical process for performing an initialization operation on a memory page upon an initial reference by an application. The process begins when a thread of a single-threaded or multi-threaded application attempts to access a memory location using a specific virtual memory address (step 402). For example, during the execution of an instruction, a processor may attempt to write to the memory location, and the processor or its supporting hardware may attempt to translate the specific virtual memory address to a physical memory address (step 404), e.g., through the use of a TLB. In this example, the system detects that the memory location is within a virtual memory page that has not yet been mapped to a physical memory page, e.g., the TLB does not have an entry for the virtual memory page. Hence, the address translation fails, and a page-fault interrupt is generated (step 406).

An interrupt handler within the kernel catches the interrupt, and the interrupt handler may examine special status registers within the CPU for information about the type of exception or fault that has occurred; in addition, it may be assumed that an address register within the CPU has the address of the memory location that triggered the exception or fault. The interrupt handler may be a generic interrupt handler or an interrupt handler that is dedicated to handling page-fault interrupts. The kernel calls a memory manager or passes the interrupt to a memory management routine in some manner (step 408). The memory manager determines that the virtual memory page that is being referenced by the application has not yet been accessed. The memory manager can determine the state of a virtual memory page by examining its memory management data structures; for example, a data structure entry may indicate that its associated virtual memory page has been paged out to secondary memory, which would have caused the page-fault interrupt since the physical memory page to which it is mapped was not present within the TLB. In this example, the memory manager determines that it needs to allocate a new physical memory page (step 410), which it selects from an unallocated or free page list (412).

The memory manager maps the physical memory page into the referencing application's address space by associating the physical memory page with the virtual memory page (step 414), e.g., by relating the virtual memory page to the physical memory page within the appropriate memory management data structures that the memory manager maintains for the application. The memory manager then initializes the physical memory page by writing zeroes into all of the memory locations within the physical memory page, i.e., by zeroing the physical memory page (step 416).

The memory manager then returns from the original interrupt (step 418); depending on the processor architecture, the return from the interrupt may require particular operations, such as restoring the execution context of the application that had been previously saved when the kernel fielded the interrupt. After returning from the interrupt, the application may access the memory location at the specific virtual memory address as was previously attempted (step 420), and the memory access would be completed by performing the memory operation on the corresponding memory location in the associated physical memory page, thereby concluding the process.

FIGS. 2-4 illustrate that, in the prior art, a kernel would initialize a newly allocated memory page while handling an interrupt that has been generated by a memory operation that is directed to the newly allocated memory page. In other words, the prior art initializes a newly allocated memory page while on an interrupt level. The present invention recognizes that certain advantages can be achieved by initializing a newly allocated page via an off-level worker thread, as illustrated with respect to the remaining figures.

Figure 5:
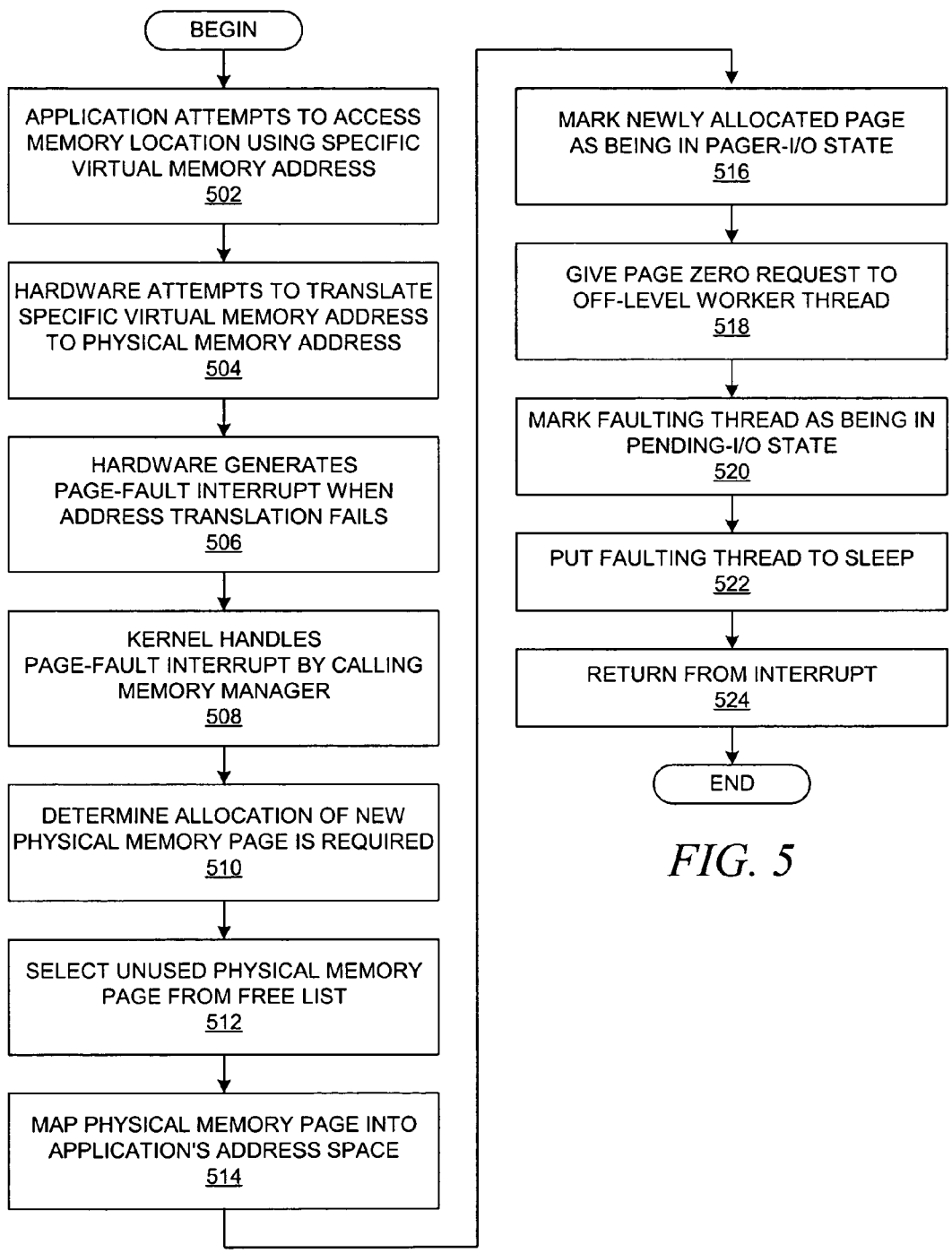
FIG. 5 depicts a flowchart that shows a process for initiating a zeroing-type initialization operation by an off-level kernel worker thread on a newly allocated memory page.

With reference now to FIG. 5, a flowchart depicts a process for initiating a zeroing-type initialization operation by an off-level kernel worker thread on a newly allocated memory page in accordance with an embodiment of the present invention. As should be apparent from the discussion of FIG. 5 below, the process that is shown in FIG. 5 is initially similar to the process that is shown in FIG. 4 except that FIG. 5 has an alternate conclusion to the process that is shown in FIG. 4. Both processes are initiated by a similar operation within an application thread, but FIG. 5 concludes the interrupt level operations by shifting the responsibility for initialization of a newly allocated physical memory page to an off-level worker thread.

The process begins when a thread of an application attempts to access a memory location using a specific virtual memory address (step 502). The processor or its supporting hardware may attempt to translate the specific virtual memory address to a physical memory address (step 504), e.g., through the use of a TLB. In this example, the address translation fails, and a page-fault interrupt is generated (step 506). The kernel calls a memory manager or passes the interrupt to a memory management routine in some manner (step 508). In this example, the memory manager determines that it needs to allocate a new physical memory page (step 510), which it selects from an unallocated or free page list (512). The memory manager maps the physical memory page into the referencing application's address space by associating the physical memory page with the virtual memory page (step 514), e.g., by relating the virtual memory page to the physical memory page within the appropriate memory management data structures that the memory manager maintains for the application.

After allocating a physical memory page, the process in FIG. 4 shows that the memory manager initializes the physical memory page during the processing of the interrupt. In contrast, steps 516-522 in FIG. 5 illustrate part of a novel approach to performing page initialization.

The memory manager indicates within the appropriate data structures that the newly allocated memory page is in a pager-I/O state (step 516). The memory manager then gives a page-zero request to an off-level worker thread (step 518). The page-zero request is a particular type of memory page initialization request in which zero values are written to each memory location within the memory page. The off-level worker thread has kernel-level privileges, thereby allowing the worker thread to access and write to kernel-maintained data structures. In addition, the off-level worker thread is preferably preemptable, thereby allowing preemption of the initialization operation that is to be subsequently performed by the worker thread. Furthermore, the worker thread may execute at a configurable priority level, thereby allowing adjustment of the importance with which the initialization operations are completed.

The memory manager then marks within the appropriate data structures that the thread that caused the original page-fault interrupt is in a pending pager-I/O state (step 520), thereby indicating that the thread is waiting for a pseudo-pager-I/O operation to be completed on the memory page. In this example of an embodiment of the present invention, the page initialization is completed as a type of pseudo-pager-I/O operation, as explained in more detail further below. The faulting thread is then put to sleep to wait for the completion of the page initialization operation (step 522), and the process concludes when the memory manager returns from the interrupt-level processing (step 524).

With reference now to FIG. 6, a flowchart depicts a process for performing a zeroing-type initialization operation by an off-level kernel worker thread on a newly allocated memory page in accordance with an embodiment of the present invention. As mentioned above at step 518 in FIG. 5, a memory manager gives a page-zero request, i.e., a zeroing-type initialization request, to an off-level worker thread. At some subsequent point in time, the off-level worker thread turns its attention to this particular request, and FIG. 6 illustrates the processing of this request. For example, the off-level worker thread may have its own data structures for managing these requests, such as a first-in, first-out (FIFO) queue from which it retrieves and processes initialization requests in the order in which they were placed on the queue by the memory manager. The manner in which the initialization requests are given to the off-level worker thread by the memory manager may vary in different embodiments of the present invention.

The process that is illustrated in FIG. 6 commences with the off-level worker thread, at some point in time, obtaining a page initialization request (step 602), e.g., the next request in a work queue. The request would comprise some type of identifying information for the page that should be initialized by the off-level worker thread. In addition, the request would indicate what type of initialization should be performed on the page, such as a page-zero initialization or a page-copy initialization. In the example that is shown in FIG. 6, a zeroing-type initialization is illustrated. Hence, the off-level worker thread zeroes the identified page (step 604).

The off-level worker thread then indicates within an appropriate data structure that the newly zeroed page is in a useable state (step 606), i.e., some type of normal state that is able to be accessed by an application, thereby clearing the previous pager-I/O state. Assuming that one of the memory management data structures contains the thread identifier for the thread that caused the page fault that required the allocation and initialization of a new memory page, the off-level worker thread can obtain the thread identifier for this thread and then put the thread into a runnable state (or request that the thread should be put into a runnable state) (step 608). After that point in time, the application thread may then start running and access the newly allocated and newly zeroed page without generating another page fault. The off-level worker thread then clears or deletes the page initialization request that it has just completed (step 610), and the process is complete.

FIG. 7 provides a basis for a discussion of a typical copy-on-write function. In contrast to FIGS. 5-6, which depict an embodiment of the present invention that initializes a memory page using a zeroing-type initialization operation, FIGS. 8-9 depict an embodiment of the present invention that initializes a memory page in conjunction with the use of a copy-on-write function.

With reference now to FIG. 7, a flowchart depicts a typical process by which an application configures a memory page using a copy-on-write operation. The process begins with an application calling a copy-on-write type of function (step 702), and the process concludes with the memory manager marking at least one memory page as having a copy-on-write status (step 704).

Many operating systems support copy-on-write functions for various purposes. For example, an application process may fork into a parent process and a child process. If the memory manager made copies of all of the pages of the parent process during the fork operation so that the child process had its own unique copies, then the fork process would introduce a significant amount of delay or overhead. Instead, the child process obtains its own page tables, and the memory pages are marked or configured in some manner to reflect that they have a copy-on-write restriction, which is a type of read-only protection. The child process may continue to read from these pages, but when the child process attempts to write to these pages, a fault is triggered, and then the page is copied at that time. In this manner, the pages are copied on an as-needed basis, and the overhead of copying the pages is spread over time.

Figure 8:
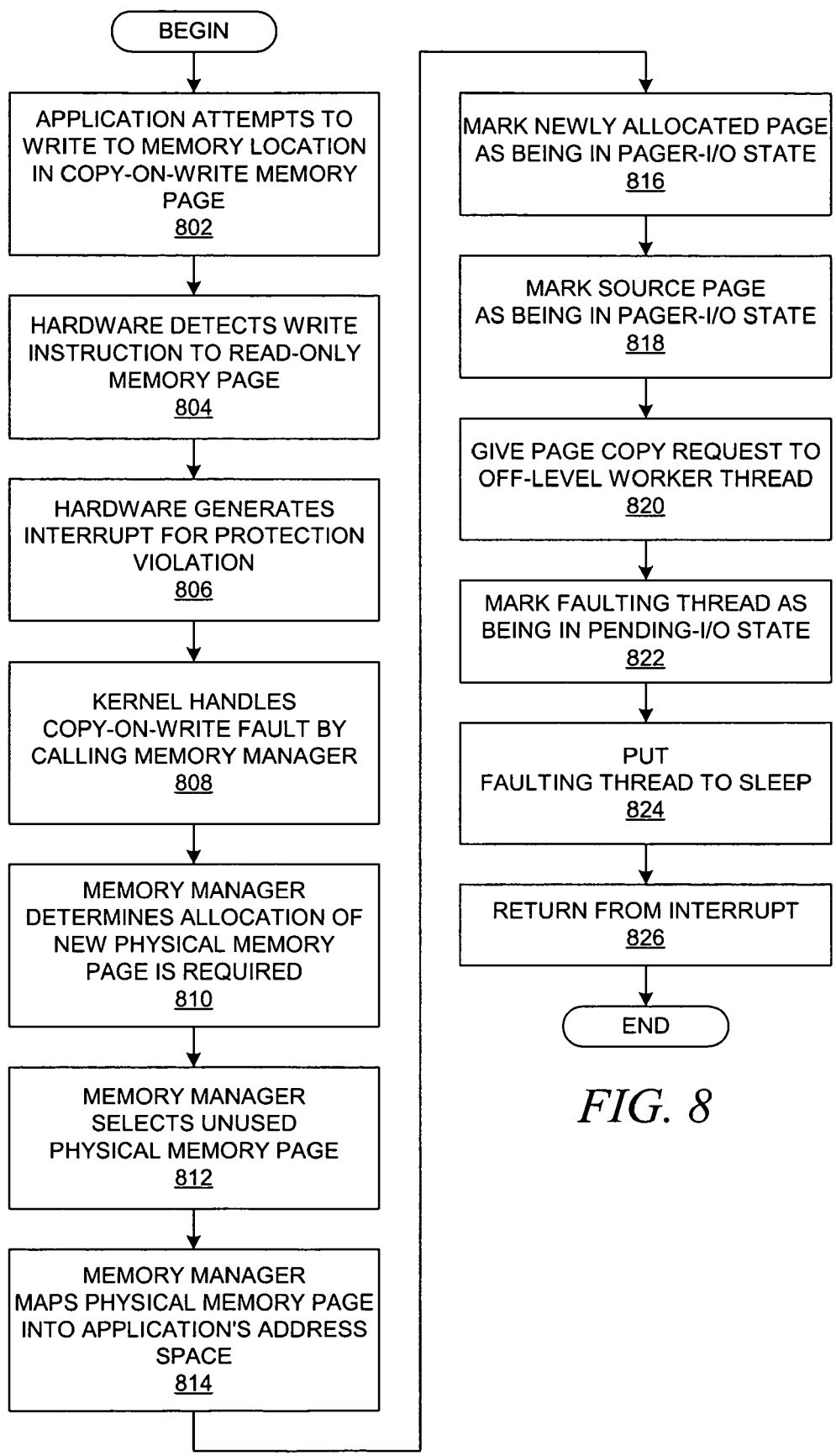
FIG. 8 depicts a flowchart that shows a process for initiating a page-copy initialization operation by an off-level kernel worker thread on a newly allocated memory page.

With reference now to FIG. 8, a flowchart depicts a process for initiating a page-copy initialization operation by an off-level kernel worker thread on a newly allocated memory page in accordance with an embodiment of the present invention. As should be apparent from the discussion of FIG. 8 below, the process that is shown in FIG. 8 is somewhat similar to the process that is shown in FIG. 5; however, FIG. 5 depicts an embodiment of the present invention that initializes a memory page using a zeroing-type initialization operation, whereas FIG. 8 depicts an embodiment of the present invention that initializes a memory page in conjunction with the use of a copy-on-write function.

The process begins when a thread of an application attempts to write to a memory location using a specific virtual memory address (step 802), and the memory location resides in a memory page that has previously been marked as a copy-on-write page, e.g., such as step 704 in FIG. 7. The underlying hardware may have direct support for copy-on-write flags that are associated with memory page information, e.g., within a memory management unit (MMU). However, it is more likely that the hardware only provides support for marking a memory page as read-only, and the kernel has the responsibility of determining when a protection violation with respect to that memory page is the result of an attempt to write to a copy-on-write memory page. In the example that is shown in FIG. 8, the hardware detects an attempt to write to a memory page that has been flagged as read-only (step 804), and the hardware generates an interrupt for a protection violation (step 806). The kernel receives the interrupt and determines that the memory location of the attempted write instruction resides within a copy-on-write page, e.g., by reference to its memory management data structures. The kernel handles the copy-on-write fault by calling the memory manager (step 808).

The memory manager determines that the copy-on-write fault requires the allocation of a physical memory page for the new copy (step 810), and the memory manager selects an unused physical memory page from a free page list (step 812). The memory manager maps the physical memory page into the referencing application's address space by associating the physical memory page with the virtual memory page (step 814), e.g., by relating the virtual memory page to the physical memory page within the appropriate memory management data structures that the memory manager maintains for the application.

In a typical kernel, the memory manager would then initialize the physical memory page by copying the contents of the original memory page to the newly allocated memory page during the processing of the interrupt. In contrast, steps 816-824 in FIG. 8 illustrate part of a novel approach to performing page initialization.

The memory manager indicates within the appropriate data structures that the newly allocated memory page and the source page are in an pager-I/O state (steps 816 and 818, respectively). The memory manager then gives a page-copy request to an off-level worker thread (step 820). The page-copy request is a particular type of memory page initialization request in which the data value from each memory location within the original or source memory page is copied to a corresponding memory location within the newly allocated memory page. In a manner similar to that mentioned above with respect to FIG. 5, the off-level worker thread has kernel-level privileges, thereby allowing the worker thread to access and write to kernel-maintained data structures. In addition, the off-level worker thread is preferably preemptable, thereby allowing preemption of the initialization operation that is to be subsequently performed by the worker thread. Furthermore, the worker thread may execute at a configurable priority level, thereby allowing adjustment of the importance with which the initialization operations are completed.

The memory manager then marks within the appropriate data structures that the thread that caused the original copy-on-write interrupt is in a pending pager-I/O state (step 822), thereby indicating that the thread is waiting for a pseudo-pager-I/O operation to be completed on the memory page. In this example of an embodiment of the present invention, the page initialization is completed as a type of pseudo-pager-I/O operation, as explained in more detail further below. The faulting thread is then put to sleep to wait for the completion of the page initialization operation (step 824), and the process concludes when the memory manager returns from the interrupt-level processing (step 826).

With reference now to FIG. 9, a flowchart depicts a process for performing a copying-type initialization operation by an off-level kernel worker thread on a newly allocated memory page in accordance with an embodiment of the present invention. As mentioned above at step 820 in FIG. 8, a memory manager gives a page-copy request, i.e., copying-type initialization request, to an off-level worker thread. At some subsequent point in time, the off-level worker thread turns its attention to this particular request, and FIG. 9 illustrates the processing of this request. Thus, the process that is shown in FIG. 9 is somewhat similar to the process that is shown in FIG. 6.

The process that is illustrated in FIG. 9 commences with the off-level worker thread, at some point in time, obtaining a page initialization request (step 902), e.g., the next request in a work queue. The request would comprise some type of identifying information for the page that should be initialized by the off-level worker thread. In addition, the request would indicate what type of initialization should be performed on the page, such as a page-zero initialization or a page-copy initialization. In the example that is shown in FIG. 9, a copying-type initialization is illustrated, so the off-level worker thread obtains an identifier for the source page and an identifier for the destination page and then copies the contents of the source page to the destination page (step 904).

The off-level worker thread then indicates within an appropriate data structure that the newly copied page and the source page are in a useable state (steps 906 and 908, respectively), i.e., some type of normal state that is able to be accessed by an application, thereby clearing the previous pager-I/O state. Assuming that one of the memory management data structures contains the thread identifier for the thread that caused the page fault that required the allocation and initialization of a new memory page, the off-level worker thread can obtain the thread identifier for this thread and then put the thread into a runnable state (or request that the thread should be put into a runnable state) (step 910). After that point in time, the application thread may then start running and access the newly allocated and newly copied page without generating another protection violation. The off-level worker thread then clears or deletes the page initialization request that it has just completed (step 912), and the process is complete.

Figure 10:
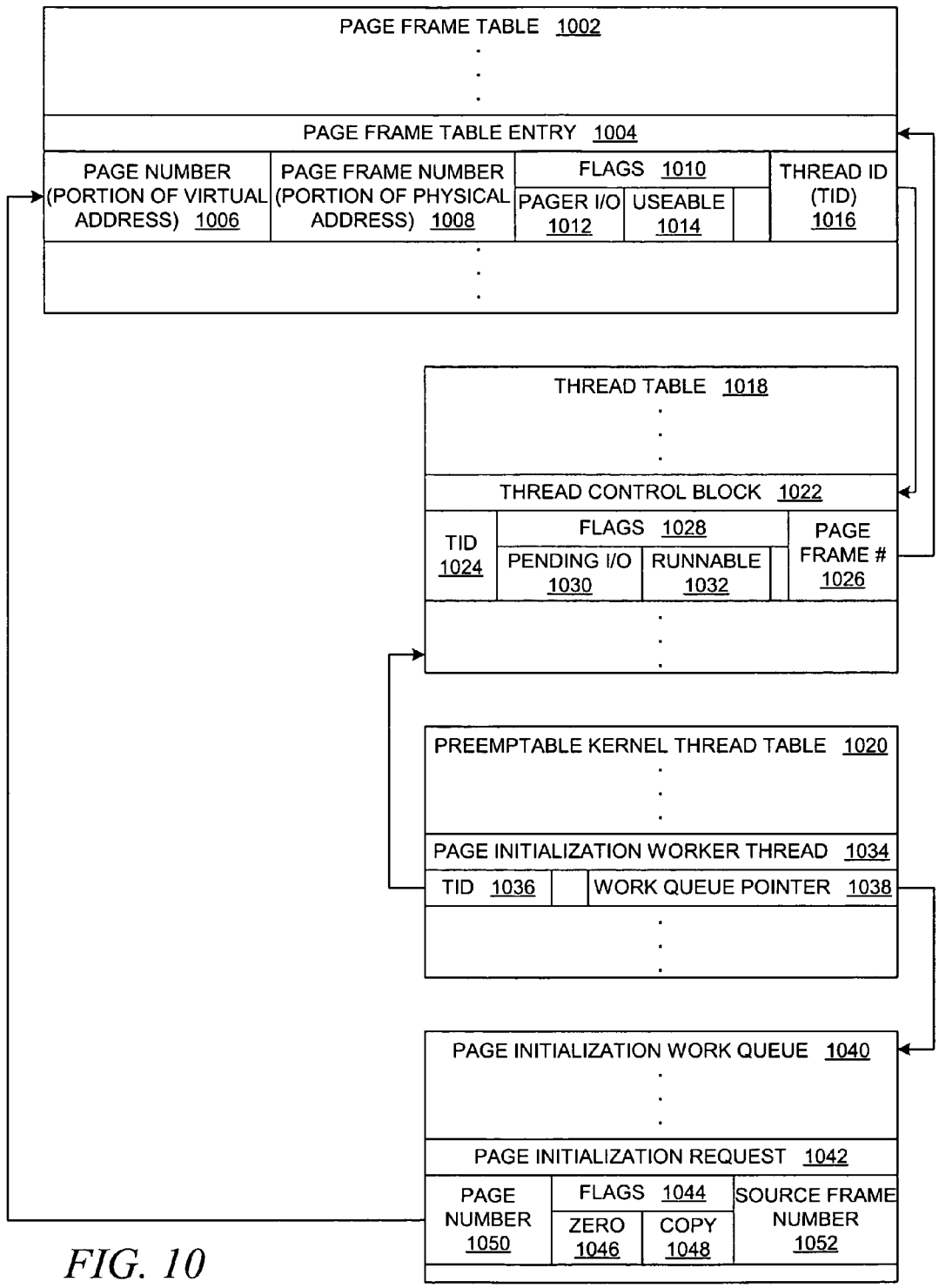
FIG. 10 depicts a block diagram that shows some of the data structures that might be used by a kernel to implement page initialization operations using an off-level kernel worker thread.

With reference now to FIG. 10, a block diagram depicts some of the data structures that might be used by a kernel to implement page initialization operations using an off-level kernel worker thread in accordance with an embodiment of the present invention. Page frame table 1002 is an application-specific mapping of virtual memory pages to physical memory pages, i.e., page frames. Each page frame table is primarily managed by a memory manager within the kernel. Page frame table 1002 contains entries for the virtual memory pages that have been accessed within the application's virtual address space by the application. For example, page frame table 1002 contains page frame table entry 1004 that relates a virtual memory page that is identified by page number 1006 to a physical memory page that is identified by page frame number 1008.

Flag field 1010 contains multiple flags for indicating various conditions or states that are applicable to the memory pages that are identified within page frame table entry 1004. For example, pager-I/O flag 1012 indicates that the page frame is being paged in or paged out to/from main memory from/to secondary memory; different flags may be used to indicate paging in and paging out. Useable flag 1014 indicates that the page frame can be used by an application, i.e., the page frame is in a normal state with no pending restrictions.

Thread identifier (TID) 1016 within page frame table entry 1004 indicates the thread that may have caused a particular condition, state, or restriction to be placed on the page frame that is associated with page frame table entry 1004. It may be useful to place a TID within a page frame table entry so that the state of the identified thread may be changed in accordance with any changes in the state of the page frame that is also identified within the page frame table entry. For example, the TID within a page frame table entry may be used to identify a thread that has generated a page-fault, and when the status of the page frame changes, the TID may be used to locate other information about the faulting thread, e.g., within a thread table.

Thread table 1018 contains information about threads that are being managed by the kernel. In an alternative embodiment, the kernel might maintain multiple application-specific thread tables along with a kernel-specific thread table for kernel-level threads. In this example, thread table 1018 contains information about all concurrently executing threads while auxiliary tables are used for other purposes; for example, preemptable kernel thread table 1020 may be used to manage information about threads that have kernel-level privileges yet are preemptable, such as various off-level worker threads that perform various functions.

Thread table 1018 contains a thread control block for each thread that is being managed. Thread control block 1022 is associated with a thread that is identified by TID 1024. In this example, TID 1016 and TID 1024 may contain the same value. TID 1016 in page frame table entry 1004 allows a kernel-level thread to locate thread control block 1022. In addition, thread control block 1022 contains page frame number field 1026, which allows a kernel-level thread to find information about a page frame that has caused a change in the state of the thread that is identified by TID 1024. In this manner, the two data structures are linked so that changes in the states of the respective thread or page frame may be reflected in the data structures.

Thread table 1018 may be primarily managed by a thread scheduler within the kernel. Flag field 1028 contains multiple flags for indicating various conditions or states that are applicable to the threads that are managed by the thread scheduler. For example, pending-I/O flag 1030 indicates that the thread is waiting for the completion of an I/O operation on a page frame, such as pager I/O. Runnable flag 1032 indicates that the thread is ready for execution, i.e., the thread is not sleeping or otherwise suspended.

As mentioned above, preemptable kernel thread table 1020 may be used to manage information about certain kernel-level threads. Information about page initialization worker thread 1034 may be stored at a predetermined location within preemptable kernel thread table 1020. This table entry may contain thread ID 1036 for the worker thread, which relates the table entry to a thread control block in the thread table (not shown). The table entry may also contain work queue pointer 1038 that points to the work queue for this particular worker thread, which in this case is page initialization work queue 1040 that contains page initialization requests, such as page initialization request 1042.

Each page initialization request may contain flags 1044 that indicate various conditions of the request, including the type of request. Zero flag 1046 indicates that a page initialization request is a zeroing-type initialization request, while copy flag 1048 indicates that a page initialization request is a copying-type initialization request. Page number 1050 indicates the memory page that is the target of the initialization operation, and source page frame number 1052 indicates the page frame that is the source of the contents to be copied to a newly allocated memory page. Using page frame table 1002, the page initialization worker thread can obtain or store information about the memory pages.

The data structures that are illustrated in FIG. 10 are merely examples of data structures that may be used to support the present invention. These can be related back to the processes that are shown in FIGS. 5-6 and FIGS. 8-9. After a new page frame has been allocated by the memory manager, e.g., such as step 512 in FIG. 5 or step 812 in FIG. 8, the page frame is mapped to its virtual memory page by creating a page frame table entry.

In the present invention, rather than continuing the interrupt-level processing to perform the page initialization immediately after the page frame has been allocated, the duty of initializing the page frame is shifted to a page initialization worker thread, and the application thread is put to sleep until the page initialization is completed. Using thread table 1018, the thread scheduler can select a next thread to be dispatched based on the status flags for a thread and some form of time slice algorithm that allocates execution time to threads based on their associated priorities. At some point in time, the thread scheduler selects the page initialization worker thread to run, and the page initialization worker thread finds page initialization request 1042. After completing the requested page-zero operation or the requested page-copy request, the page initialization worker thread marks the faulting thread as runnable, and the page initialization worker thread may go to sleep. At some point in time, the thread scheduler selects the application thread to execute, and the application thread can execute without causing the same fault that required the page allocation and initialization operations.

The advantages of the present invention should be apparent in view of the detailed description of the invention that is provided above. A page frame is zeroed or copied by a kernel off-level worker thread. The page initialization operation is not performed at interrupt-level. With the present invention, it will be less likely that lower priority interrupts would be lost. In addition, the thread scheduler could schedule threads more accurately, and system slowdowns that are caused by page initialization operations would be reduced since the worker thread could be preempted.

The exemplary embodiments of the present invention have been described above with some characteristics that should enable the present invention to be implemented within certain operating systems without requiring substantial modifications. In these examples, the page initialization operations may be treated as a type of pseudo-pager-I/O, thereby allowing much of the pre-existing operating system functionality for pager-I/O to be extended to support the present invention. In this manner, no new major serialization would be needed; the page-zero or page-copy operations can take advantage of the pre-existing pager-I/O serialization.

For example, if multiple threads fault on the same page, then the first thread would initiate the page initialization operation while the other threads would wait, e.g., by sleeping, for the page initialization to complete, e.g., as signaled by a pseudo-I/O completion. In addition, no new thread states would be required; threads that are waiting for a page initialization can just be put into the pending-pager-I/O state. Other infrastructure that is related to page-based I/O may be used; e.g., system monitoring commands to display threads in an I/O state may function without any changes.

Other advantages include that only one page-fault is required to initialize an entire large page-frame, and moreover, that pages continue to be allocated on-demand rather than statically at process initialization time.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for initializing a memory page, the method comprising:
   in response to a memory operation by a first thread, allocating a memory page;
   generating a request for a second thread to initialize the allocated memory page; and
   initializing the allocated memory page by the second thread in accordance with the request; and,
   indicating the memory page as being in a pager input/output state after allocating the memory page; and
   indicating the allocated memory page as being in a normal state after initializing the memory page.

2. The method of claim 1 further comprising:
   putting the first thread into a sleep state prior to initialization of the allocated memory page; and
   in response to completion of initialization of the allocated memory page, putting the first thread into a runnable state.

3. The method of claim 1 further comprising:
   zeroing the allocated memory page to initialize the allocated memory page.

4. The method of claim 1 further comprising:
   copying contents from a source page to the allocated memory page to initialize the allocated memory page, wherein the request identifies the source page.

5. The method of claim 1 further comprising:
   receiving an interrupt prior to allocating the memory page; and
   returning from the interrupt after generating the request for the second thread to initialize the allocated memory page.

6. The method of claim 5 further comprising:
   identifying the interrupt as a result of a page fault.

7. The method of claim 5 further comprising:
   identifying the interrupt as a result of a copy-on-write fault.

8. The method of claim 1 wherein the memory page is allocated to an application comprising the first thread.

9. The method of claim 1 wherein the second thread is a kernel worker thread.

10. A distributed data processing system for initializing a physical memory page, the distributed data processing system comprising:
    means for allocating a memory page in response to a memory operation by a first thread;
    means for generating a request for a second thread to initialize the allocated memory page; and
    means for initializing the allocated memory page by the second thread in accordance with the request; and
    means for indicating the memory page as being in a pager input/output state after allocating the memory page; and
    means for indicating the allocated memory page as being in a normal state after initializing the memory page.

11. The distributed data processing system of claim 10 further comprising:
    means for putting the first thread into a sleep state prior to initialization of the allocated memory page; and
    means for putting the first thread into a runnable state in response to completion of initialization of the allocated memory page.

12. The distributed data processing system of claim 10 further comprising:
    means for zeroing the allocated memory page to initialize the allocated memory page.

13. The distributed data processing system of claim 10 further comprising:
    means for copying contents from a source page to the allocated memory page to initialize the allocated memory page, wherein the request identifies the source page.

14. The distributed data processing system of claim 10 further comprising:
    means for receiving an interrupt prior to allocating the memory page; and
    means for returning from the interrupt after generating the request for the second thread to initialize the allocated memory page.

15. The distributed data processing system of claim 14 further comprising:
    means for identifying the interrupt as a result of a page fault.

16. The distributed data processing system of claim 14 further comprising:
    means for identifying the interrupt as a result of a copy-on-write fault.

17. The distributed data processing system of claim 10 wherein the memory page is allocated to an application comprising the first thread.

18. The distributed data processing system of claim 10 wherein the second thread is a kernel worker thread.

19. A computer program product stored on a computer readable storage medium for use in a data processing system for initializing a memory page, the computer program product comprising:
    means for allocating a memory page in response to a memory operation by a first thread;
    means for generating a request for a second thread to initialize the allocated memory page; and
    means for initializing the allocated memory page by the second thread in accordance with the request; and
    means for indicating the memory page as being in a pager input/output state after allocating the memory page; and
    means for indicating the allocated memory page as being in a normal state after initializing the memory page.

20. The computer program product of claim 19 further comprising:
    means for putting the first thread into a sleep state prior to initialization of the allocated memory page; and
    means for putting the first thread into a runnable state in response to completion of initialization of the allocated memory page.

21. The computer program product of claim 19 further comprising:
    means for zeroing the allocated memory page to initialize the allocated memory page.

22. The computer program product of claim 19 further comprising:
    means for copying contents from a source page to the allocated memory page to initialize the allocated memory page, wherein the request identifies the source page.

23. The computer program product of claim 19 further comprising:
    means for receiving an interrupt prior to allocating the memory page; and
    means for returning from the interrupt after generating the request for the second thread to initialize the allocated memory page.

24. The computer program product of claim 23 further comprising:
    means for identifying the interrupt as a result of a page fault.

25. The computer program product of claim 23 further comprising:
    means for identifying the interrupt as a result of a copy-on-write fault.

26. The computer program product of claim 19 wherein the memory page is allocated to an application comprising the first thread.

27. The computer program product of claim 19 wherein the second thread is a kernel worker thread.

* * * * *